April 23, 1935.   W. M. HAHNEMANN   1,999,047
SYSTEM FOR LANDING AIRCRAFT
Filed May 10, 1933

Inventor:
Walter Max Hahnemann
by R. C. Hopgood
Attorney

Patented Apr. 23, 1935

1,999,047

UNITED STATES PATENT OFFICE 1,999,047

SYSTEM FOR LANDING AIRCRAFT

Walter Max Hahnemann, Berlin-Marienfelde, Germany, assignor to C. Lorenz Aktiengesellschaft, Berlin-Tempelhof, Germany Application May 10, 1933, Serial No. 670,386
In Germany November 29, 1932

6 Claims. (Cl. 250—11)

It is well known, for the purpose of facilitating the landing of aeroplanes to employ so-called slip-way beacons, which radiate a club-shaped bundle of electromagnetic rays at a certain angle to the ground surface. When using this method, upon landing the aeroplane descends on a curve of constant field intensity. This method operates very reliably, but at the present time it has been found impracticable to provide field intensity curves which are suitable for landing from any considerable height. If, for instance, the landing curve is so arranged that a descent from about 150 metres is possible, when using the same landing curve it is not possible to descend from 400 metres, as the upper part of the curve is too steep for the aeroplane to follow it. The conditions would be somewhat improved if flatter curves were employed, but these can only very rarely be used as the flying grounds available are generally too small for a flat curve which requires a large amount of space. It also happens that the conditions are in no way the same for all types of aeroplanes. Since one machine can descend more steeply than another the "flattening out" time and thus also the amount of space required are different according to the landing speeds of different machines.

In order to overcome these disadvantages it is desirable to avoid dependency on the curve of the same field intensity and to determine the landing curve by curves of different field intensity. This can be carried out in accordance with the invention in this way, that from a certain point (i. e. beginning the landing) the sensitivity of the indicating device is varied dependent upon time.

Figure 1:
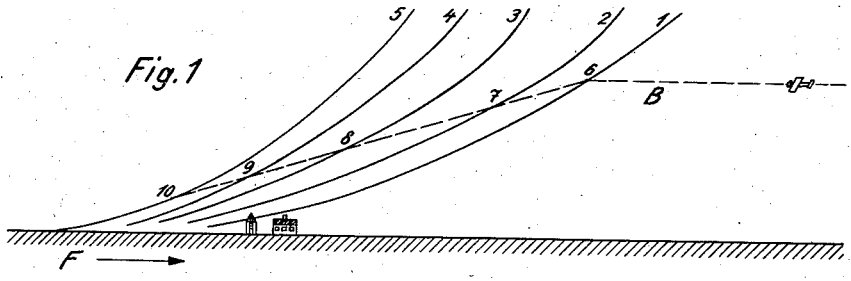
Figure 2:
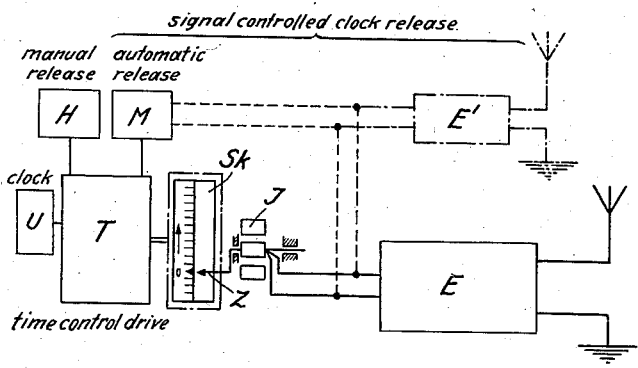
Figure 3:
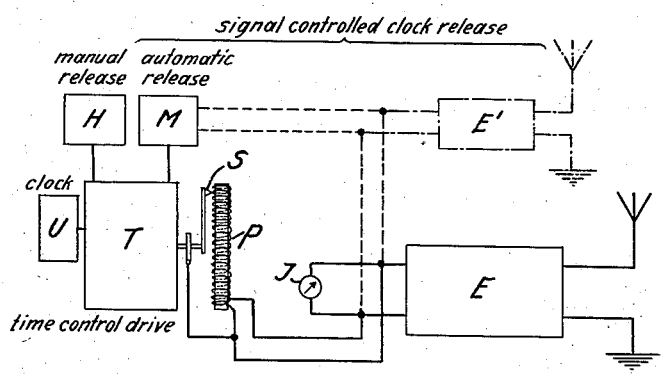
Figure 4:
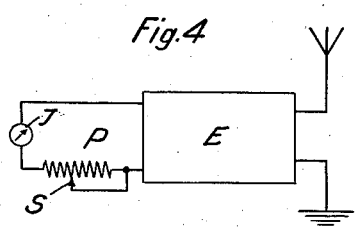
Figure 5:
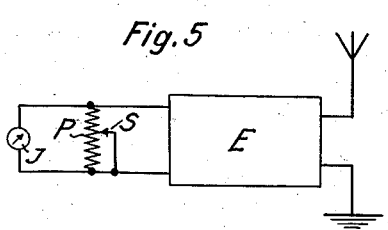

The new method is explained by way of example in the following description with reference to the accompanying drawing in which: Fig. 1 is a diagram showing an elevation of a landing ground. Fig. 2 shows one form of aeroplane equipment employing the movable scale indicating instrument; Fig. 3 is an alternative arrangement employing an indicating instrument whose sensitivity is under control of a variable resistance; Fig. 4 shows the variable resistance connected in series with the indicating instrument; and Fig. 5 shows the variable resistance connected in parallel with the indicating instrument.

I and 5 represent the lower portions of curves of different field intensity produced by a bundle of rays having a roll-shaped radiation diagram directed obliquely upward in well known manner. It is pointed out however that the new method may also be applied to roll-shaped radiation diagrams with which the direction must be determined by special devices. The track of the aeroplane is designated by B.

In the previous methods, the aeroplane which arrives on a horizontal course is steered horizontally to one of the field intensity curves 1 to 5, and then descends on this field intensity curve. The greater the altitude at which the aeroplane arrives, the flatter must be the field intensity curve of the system 1 to 5 in order that the descent shall not be too steep. It is clear from the drawing that curves 1 and 2 are already far outside the aerodrome territory F in the ground vicinity. Thus in order to render a safe landing possible, outside the actual aerodrome a larger territory must be free from buildings and other obstructions, and this in practice is seldom the case.

According to the invention the devices of known type arranged on the aeroplane are so modified that beyond the point 6 of intersection of the aeroplane track B and the field intensity curve 1, the sensitivity of the indicating device on the aeroplane is changed. This means that the aeroplane does not descend on the field intensity curve 1, but steers to the point 7 of intersection with the curve 2. The same applies for the points 8, 9 and 10. The sensitivity need not necessarily be decreased linearly but the progressive decrease may be effected according to any law, in other words the landing curve may be selected as desired, by predetermining the position of the points of intersection 6 to 10. In this way a substantially straight landing path can be followed which has proved quite sufficient for practical needs. It is quite possible to compose these curves as desired according to the aerodrome and according to the type of aeroplane, so that the disadvantages described are effectively avoided and the device is capable of general use because from the beginning of the landing, that is, from the point of intersection 6 onwards, the sensitivity of the indicating device is varied dependent upon time.

According to one method of carrying out the invention there may be added to the indicating instrument either a shunt or a series resistance, the size of which is varied dependent upon time. For this purpose in the simplest case a clockwork mechanism may be provided which the pilot releases as soon as the point 6 is reached, or it may be arranged that the device is automatically released as soon as a certain receiving field intensity is reached. In the last case, however, bad landings may occur through fluctuations of the transmitting power. In this case therefore it is desirable to provide an arrangement which automatically effects the release of the clockwork mechanism when a predetermined point is flown over. For this a device is particularly suitable which on the one hand indicates the direction of the flying ground, on the other hand indicates when the aeroplane is over the point at which it is intended to attempt to land. This can be very simply provided for by utilizing a known arrangement for obtaining a zone of equal intensity which operates by means of vertical polarization. Such an arrangement, for example, comprises a vertical dipole, which is continuously fed from a transmitter, and two other dipoles which act as reflectors. These reflector dipoles are alternately manipulated according to one of the known methods, (for example in $a$—$n$—rhythm). Thus in known manner a zone of equal intensity is formed, in which signals are received as a continuous dash. This zone is formed by the fact that the circular radiation diagram of the middle dipole continuously fed by the transmitter is alternately conveyed to one side and the other in a flattened curve. If such an arrangement is overflown, then the reception stops upon the overflying as the arrangement operates with vertical polarization. This point is extremely sharp, so that this arrangement may very well be employed for the automatic release of the timing device.

The indicating device of which the scale and pointer Z is shown in Fig. 2 is located in the well known manner in the output circuit of the receiving device. The scale Sk is not fixed as is usual in such instruments, but is moved dependent upon the time, for example in the direction of the arrow of Fig. 2. The pilot, however, has to steer so that the pointer Z always points to the zero dash of the scale, that is, the sensitivity of the instrument is apparently changed with respect to the reading.

Fig. 2 illustrates the aeroplane equipment in which the indicating instrument J is connected in the output of a radio receiver E and is provided with a movable pointer Z. The movable scale SK of the indicating instrument may be slowly moved by a clockwork mechanism U connected by time control drive T to the shaft of the movable scale K. Normally, the time control drive is locked against operation. By means of a manual release H, the clock driven time control drive may be released at a certain point of time. The release may also be effected automatically by automatic release M connected to the output circuit of the radio receiver E. If desired, a separate radio receiver E' may be employed for controlling the automatic release M.

Fig. 3 shows an alternative arrangement, differing from that of Fig. 2 in the type of indicating instrument employed. In Fig. 3, the indicating instrument J, instead of having a movable scale, has its sensitivity controlled in accordance with time by means of a resistance P connected across the output circuit of the indicating instrument J. The resistance P is varied by the clockwork mechanism U acting through time controlled drive T by rotating a sliding contact S over the resistance.

Figs. 4 and 5 show the detailed circuit arrangement of the resistance control with the resistance P, in Fig. 4, connected in series with the instrument J; and, in Fig. 5, in parallel therewith. In either case the sliding contact S on the rotating contact arm cuts in and out, more or less, of the resistance P.

What is claimed is:

1. In a system for landing aeroplanes, wherein a plurality of radiated beams of electro-magnetic energy having curves of different field intensities are cut by an aeroplane on landing, characterized by the provision on the aeroplane of a radio receiver responsive to said radio beams, an indicating instrument coupled to the output circuit of said radio receiver and variably responsive to the different field intensities, means for varying in accordance with time the sensitivity of said indicating instrument, and means for starting said time controlled sensitivity varying means in operation on commencement of the landing, whereby during landing said indicating instrument is caused to maintain an apparent constant adjustment defining a predetermined landing path for the aeroplane.

2. System according to claim 1 in which means is provided for effecting the variation of the sensitivity of the said indicating instrument in accordance with a non-linear law.

3. In a system according to claim 1 in which said starting means is a hand operated device.

4. System according to claim 1 in which means is provided for automatically setting the said sensitivity varying device in operation when the aeroplane passes over a predetermined point.

5. In a system according to claim 1 in which said sensitivity varying means includes a variable resistance connected with said indicating instrument for electrically varying its sensitivity.

6. In a system according to claim 1 in which said sensitivity varying means includes a motor for moving the scale of the indicating instrument in dependence on time.

WALTER MAX HAHNEMANN.